United States Patent
Mi et al.

(10) Patent No.: US 12,360,133 B2
(45) Date of Patent: Jul. 15, 2025

(54) PIPETTE-TIP CONNECTING DEVICE AND METHOD THEREOF

(71) Applicant: DRSIGNAL BIOTECHNOLOGY CO., LTD., New Taipei (TW)

(72) Inventors: Hsin Wu Mi, New Taipei (TW); Hsin Fei Huang, New Taipei (TW)

(73) Assignee: DrSignal BioTechnology Co., Ltd., New Taipei (TW)

( * ) Notice: Subject to any disclaimer, the term of this patent is extended or adjusted under 35 U.S.C. 154(b) by 869 days.

(21) Appl. No.: 17/515,714

(22) Filed: Nov. 1, 2021

(65) Prior Publication Data

US 2023/0133990 A1    May 4, 2023

(51) Int. Cl.
  *G01N 35/10*    (2006.01)
(52) U.S. Cl.
  CPC ..... G01N 35/1065 (2013.01); G01N 35/1083 (2013.01); *G01N 2035/103* (2013.01)
(58) Field of Classification Search
  CPC .......... G01N 35/1065; G01N 35/1083; G01N 2035/103; B01L 9/00
  See application file for complete search history.

(56) References Cited

U.S. PATENT DOCUMENTS

| | | | | |
|---|---|---|---|---|
| 2003/0223916 A1* | 12/2003 | Testrut | ...................... | B01L 9/06 422/63 |
| 2006/0110296 A1* | 5/2006 | Tajima | .................. | G01N 35/025 422/63 |
| 2006/0210435 A1* | 9/2006 | Alavie | ............... | G01N 35/0092 422/65 |
| 2012/0156098 A1* | 6/2012 | Sano | ....................... | G01N 35/10 422/522 |
| 2013/0132006 A1* | 5/2013 | Gwynn | ................... | B01L 3/021 702/55 |

(Continued)

FOREIGN PATENT DOCUMENTS

| JP | H08313442 A | 11/1996 |
|---|---|---|
| JP | 2003302411 A | 10/2003 |

(Continued)

OTHER PUBLICATIONS

International Search Report Issued By Foreign Patent Office in Application No. EP21205921.6.

*Primary Examiner* — Benjamin R Whatley
*Assistant Examiner* — Curtis A Thompson
(74) *Attorney, Agent, or Firm* — Rosenberg, Klein & Lee

(57) ABSTRACT

A pipette-tip connecting device has a base, a first positioning mechanism, a second positioning mechanism, a connecting seat, a pipette-fixing seat, and a tilt actuator. The first positioning mechanism extends along a first direction. The second positioning mechanism is linked to the first slider and extending upward and downward along a second direction. The connecting seat is mounted on the second slider such that positions of the connecting seat along the first direction and the second direction are controlled by the first positioning mechanism and the second positioning mechanism respectively. The pipette-fixing seat is mounted on the connecting seat and is pivotal relative to the connecting seat. The pipette-fixing seat has a pipette-tip connector which moves in the first direction and the second direction when the pipette-fixing seat pivots. The tilt actuator controls a relative angle between the pipette-fixing seat and the connecting seat.

5 Claims, 11 Drawing Sheets

(56) References Cited

U.S. PATENT DOCUMENTS

| | | |
|---|---|---|
| 2018/0280967 A1 | 10/2018 | Gilchrist et al. |
| 2019/0041302 A1* | 2/2019 | Hunt .................... G01N 1/2813 |
| 2020/0319222 A1 | 10/2020 | Vansickler et al. |
| 2022/0120774 A1 | 4/2022 | Fujita et al. |

FOREIGN PATENT DOCUMENTS

| | | |
|---|---|---|
| JP | 2009145143 A | 7/2009 |
| JP | 201159008 A | 3/2011 |
| JP | 2019115945 A | 7/2019 |
| TW | 201827587 A | 8/2018 |
| TW | 202020429 A | 6/2020 |

* cited by examiner

PIPETTE-TIP CONNECTING DEVICE AND METHOD THEREOF

BACKGROUND OF THE INVENTION

1. Field of the Invention

The present invention relates to an automation equipment for biology and chemistry laboratories, especially to a device that is adapted for connecting a pipette-tip to a pipette.

2. Description of the Prior Arts

A pipette is a laboratory tool for precisely drawing up a measured volume of liquid and dispensing the liquid into other containers. The pipette is used in conjunction with at least one pipette-tip. A cylindrical tip connector (male part) is located at bottom of the pipette. Top of the pipette-tip is hollow and cylindrical to form a mount opening (female part). When in use, the mount opening of pipette-tip is tightly located around the tip connector and the pipette-tip is in actual contact with the liquid.

The pipette-tip is disposable and requires frequent replacement to avoid contamination in case the residual liquid in the pipette tip has any chance to contact another sample. To replace the pipette-tip, first use an ejector mechanism of the pipette to eject the pipette-tip from the tip connector, and then align and insert the tip connector into a new pipette-tip via the mount opening.

To ensure that the pipette-tip can be tightly located around the tip connector, an outer diameter of the tip connector is very close to an inner diameter of the mount opening of the pipette-tip, and therefore an axis of the tip connector must be accurately aligned with an axis of the pipette-tip before insertion. When the pipette-tip replacement is manually operated, alignment between the tip connector and the pipette-tip can be achieved correctly through vision and hand feeling.

However, a standard automation apparatus is only capable of moving the pipette along a fixed path, meaning that there is no feedback correction for aligning the tip connector with the pipette-tip, and therefore it is difficult to automate the process of pipette-tip replacement because the replacement will fail as long as there is a slight deviation of the connection path between the tip connector and the pipette-tip, and in reality it is difficult to prevent such deviation. As a result, currently the replacement of pipette-tip can only be manually operated, which is time-consuming and requires more labor.

To overcome the shortcomings, the present invention provides a pipette-tip connecting device and method thereof to mitigate or obviate the aforementioned problems.

SUMMARY OF THE INVENTION

The main objective of the present invention is to provide a pipette-tip connecting device and method thereof that allow the replacement process of pipette-tip to be automated.

In order to achieve the above objective, the present invention provides a pipette-tip connecting device which comprises a base, a first positioning mechanism, a second positioning mechanism, a connecting seat, a pipette-fixing seat, and a tilt actuator. The first positioning mechanism is mounted on the base and extends along a first direction. The first positioning mechanism has a first slider and a first actuator. The first slider is slidable along the first direction. The first actuator controls a position of the first slider along the first direction. The second positioning mechanism is linked to the first slider and extends upward and downward along a second direction. The second positioning mechanism has a second slider and a second actuator. The second slider is slidable upward and downward along the second direction. The second actuator controls a position of the second slider along the second direction. The connecting seat is mounted on the second slider. The pipette-fixing seat is mounted on the connecting seat and is pivotable relative to the connecting seat around an imaginary pivoting axis. The pipette-fixing seat has a pipette-fixing portion which moves in the first direction and the second direction when the pipette-fixing seat pivots relative to the connecting seat. The tilt actuator is mounted on the connecting seat and controls a relative angle between the pipette-fixing seat and the connecting seat. The tilt actuator is electrically connected to the first actuator and the second actuator.

When in use, pipette-tips are located under the pipette-fixing seat with mount openings thereof facing upward. Meanwhile, a pipette is fixed to the pipette-fixing seat with the tip connectors directed downward, and the alignment of tip connectors are substantially parallel to the alignment of the pipette-tips at this moment. A corner of the tip connector where a distal end surface and an annular surface thereof are connected forms two right angles when viewed laterally. Then, the tilt actuator tilts the pipette such that centerlines of the tip connectors are tilted relative to centerlines of the pipette-tips to direct one of said two right angles of each of the tip connectors toward the mount opening of a respective one of the pipette-tips. The first actuator locates one of the right angles on top of the mount opening, and then the second actuator moves the pipette downward to insert said right angle into the pipette-tip via the mount opening, wherein the annular surface of the tip connector can abut against a periphery of the mount opening to guide the insertion.

After the right corner of the tip connector is inserted, the tilt actuator gradually realigns the centerlines of the tip connectors to match with the centerlines of the pipette-tips, and meanwhile the first actuator and the second actuator compensate deviation of the tip connectors due to angle adjustment. When the tip connectors are realigned and connect primarily with the pipette-tips, the second actuator presses down the pipette such that the tip connectors are firmly connected to the pipette-tips.

In order to achieve the above objective, the present invention further provides a pipette-tip connecting method which comprises several steps as follows:

(a) Preparation for tip replacement: Fix a pipette to a pipette-fixing seat. At least one cylindrical tip connector protrudes from a bottom of the pipette. A first actuator controls a position of the pipette-fixing seat along a first direction. A second actuator controls upward and downward movement of the pipette-fixing seat. A tilt actuator controls an angle of the pipette-fixing seat. Prepare at least one pipette-tip which extends upward and downward. Each of the at least one pipette-tip has a mount opening formed on a top thereof.

(b) Tilted insertion: The tilt actuator tilts the pipette such that a centerline of each of the at least one tip connector is tilted relative to a centerline of each of the at least one pipette-tip. The first actuator aligns a distal end of each of the at least one tip connector to the mount opening of a respective one of the at least one pipette-tip, and then the second actuator moves the pipette downward such that the distal end of each of the at least one tip connector is partially inserted into the respective one of the at least one pipette-tip via the mount opening.

(c) Straightened pressing down: The tilt actuator, the first actuator, and the second actuator control the pipette such that the pipette is rotated with the at least one tip connector as center of rotation to align the centerline of each of the at least one tip connector and match with the centerline of the respective one of the at least one pipette-tip, and primarily insert the at least one tip connector into the pipette-tip. Then, the second actuator presses down the pipette such that each of the at least one tip connector is tightly fitted in the respective one of the at least one pipette-tip.

The advantage of the present invention is that the tilt actuator is configured to control tilting of the tip connectors relative to the pipette-tips such that the tip connectors of the pipette can be inserted in a tilted manner to make the correct connection with the pipette-tips more easily; that is, when viewed laterally, the tip connectors can be successfully inserted into the mount opening respectively as long as the corners are located between the widths of the mount openings. There is no need to align the corners and match with the centers of the mount openings precisely, thereby greatly reducing need of positioning accuracy by manual work and making automation of repeating the connection the pipette A with new pipet-tips possible. Production speed and labor need are therefore reduced significantly.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
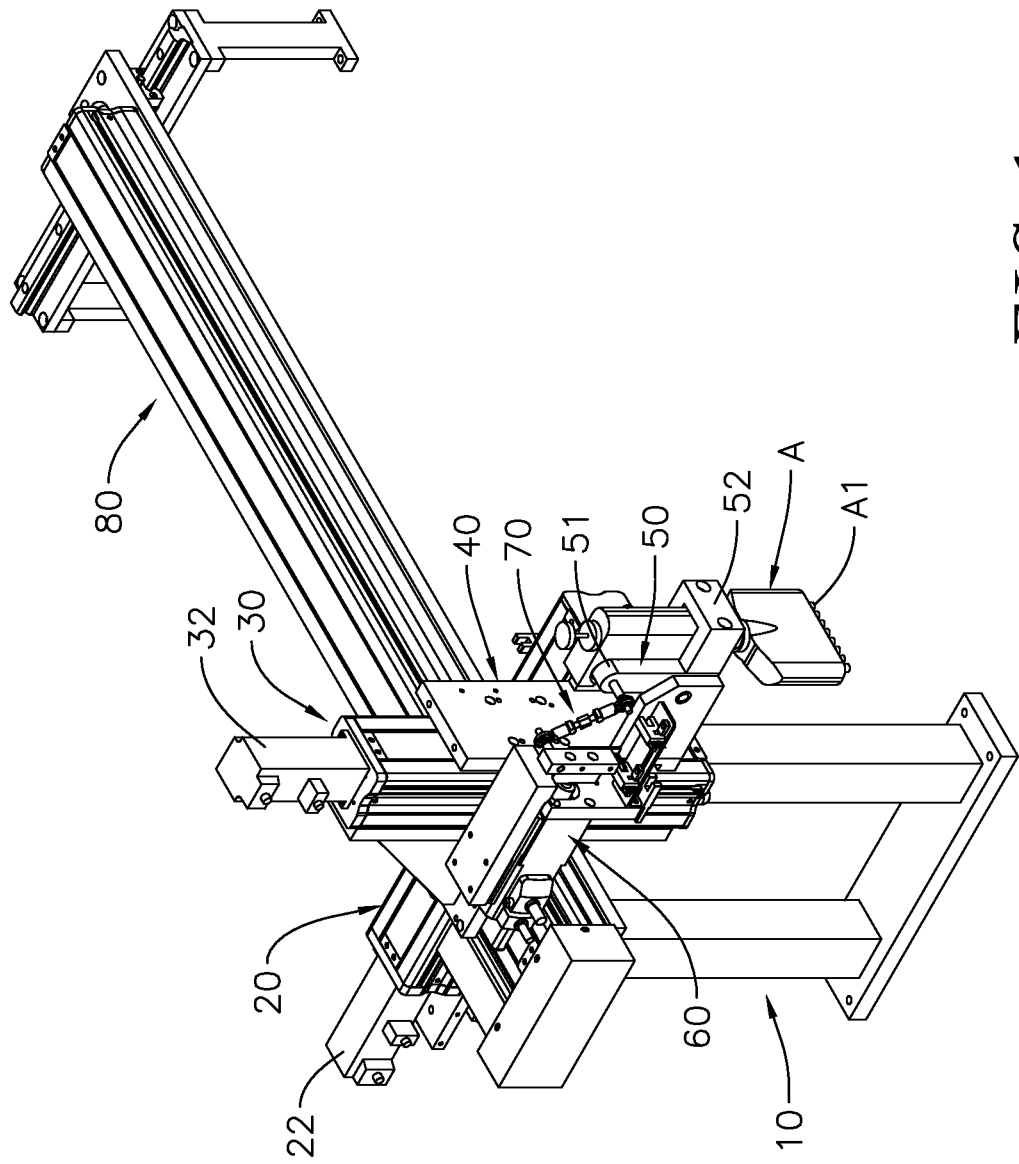
FIG. 1 is a perspective view of a pipette-tip connecting device in accordance with the present invention.

With reference to FIG. 1, a pipette-tip connecting device in accordance with the present invention is configured to connect pipette-tips B to tip connectors A1 in a bottom of a pipette A. The tip connectors A1 are preferably cylindrical. The pipette A may have only one tip connector A1. Multiple unused pipette-tips B are orderly arranged in a box. The pipette-tips B extend upwards and downwards, and each of the pipette-tips B has a mount opening formed on top thereof.

Figure 2:
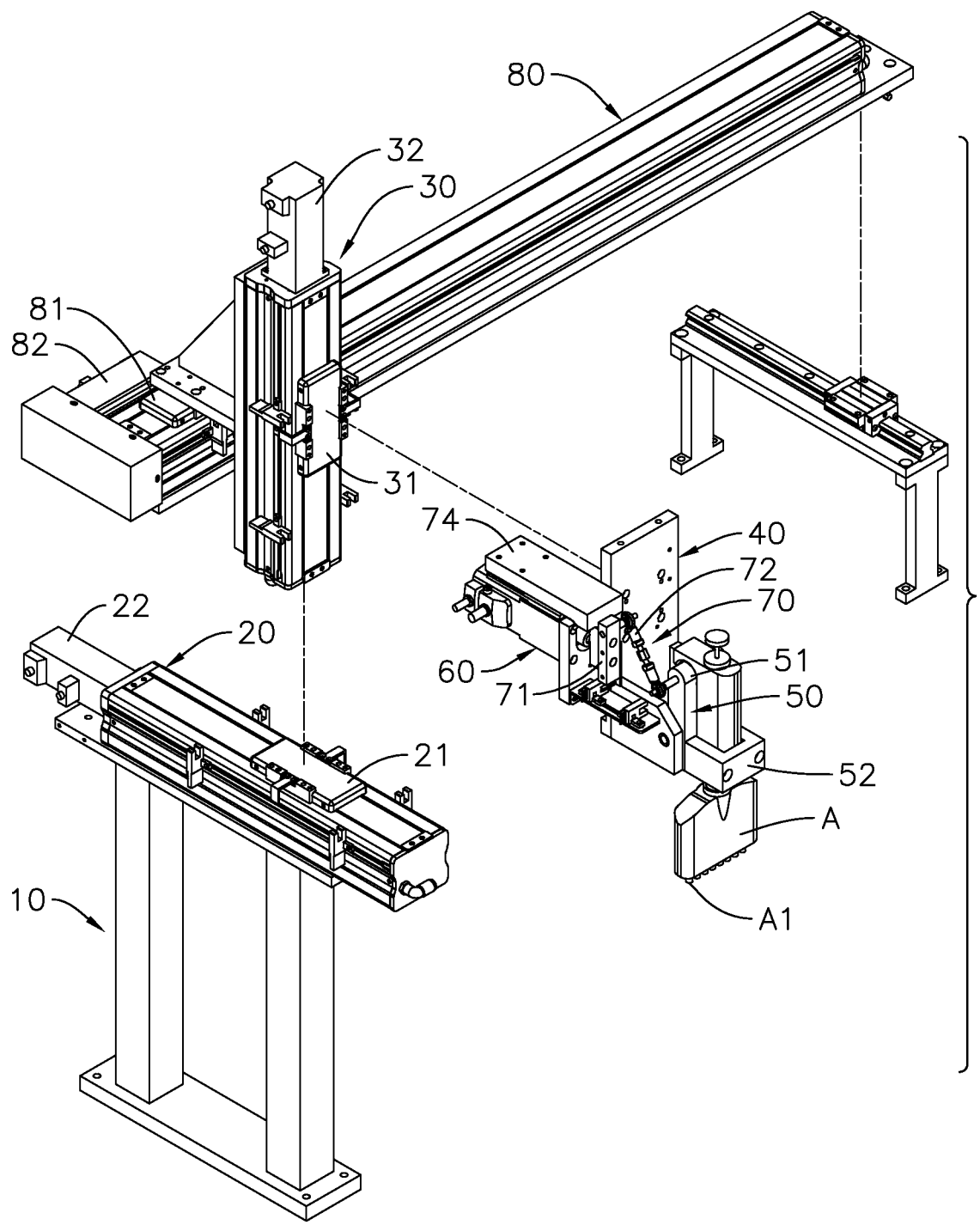
FIG. 2 is an exploded perspective view of the pipette-tip connecting device in FIG. 1.
Figure 4:
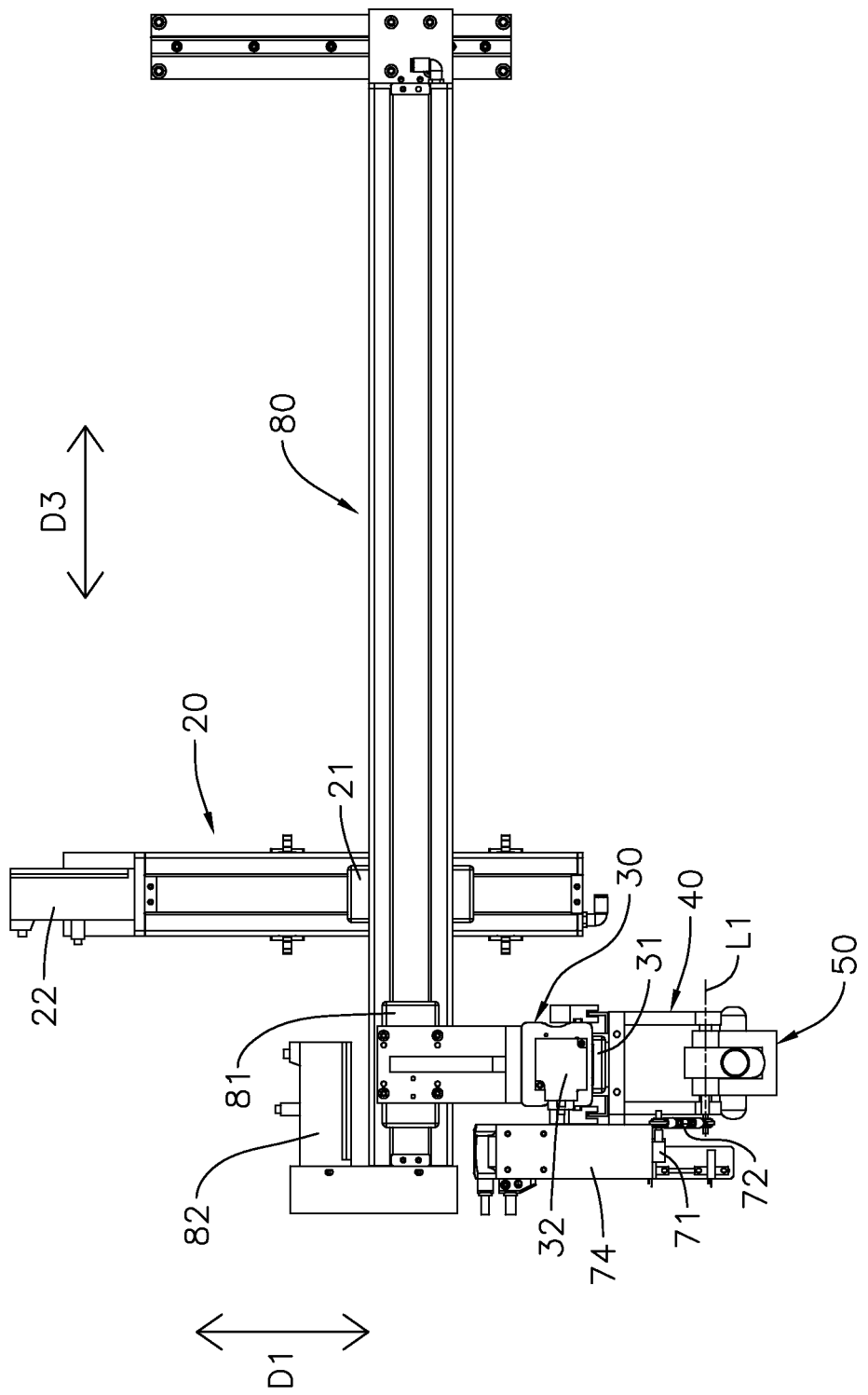
FIG. 4 is a top view of the pipette-tip connecting device in FIG. 1.

With reference to FIGS. 1, 2, and 4, the pipette-tip connecting device has a base 10, a first positioning mechanism 20, a second positioning mechanism 30, a connecting seat 40, a pipette-fixing seat 50, and a tilt actuator 60. In the preferred embodiment, the pipette-tip connecting device further has a linkage mechanism 70 and a third positioning mechanism 80.

The first positioning mechanism 20 is mounted on the base 10 and extends along a first direction D1. The first direction D1 is preferably horizontal. The first positioning mechanism 20 has a first slider 21 and a first actuator 22. The first slider 21 is slidable along the first direction D1. The first actuator 22 controls a position of the first slider 21 along the first direction D1. To be precise, the first positioning mechanism 20 is a horizontally mounted linear module. The first actuator 22 is a motor controlling the first slider 21 via a ball screw of the first positioning mechanism 20.

The second positioning mechanism 30 is linked to the first slider 21 such that the first positioning mechanism 20 controls a position of the second positioning mechanism 30 along the first direction D1. In the preferred embodiment, the third positioning mechanism 80 is mounted between the first slider 21 of the first positioning mechanism 20 and the second positioning mechanism 30; that is, the second positioning mechanism 30 is linked to the first slider 21 via the third positioning mechanism 80.

The third positioning mechanism 80 extends along a third direction D3 and has a third slider 81 and a third actuator 82. The third slider 81 is movable along the third direction D3 such that the second positioning mechanism 30 can be aligned with other experiment equipment. In another preferred embodiment, the second positioning mechanism 30 is omitted, and the second positioning mechanism 30 is directly mounted on the first slider 21.

Figure 5:
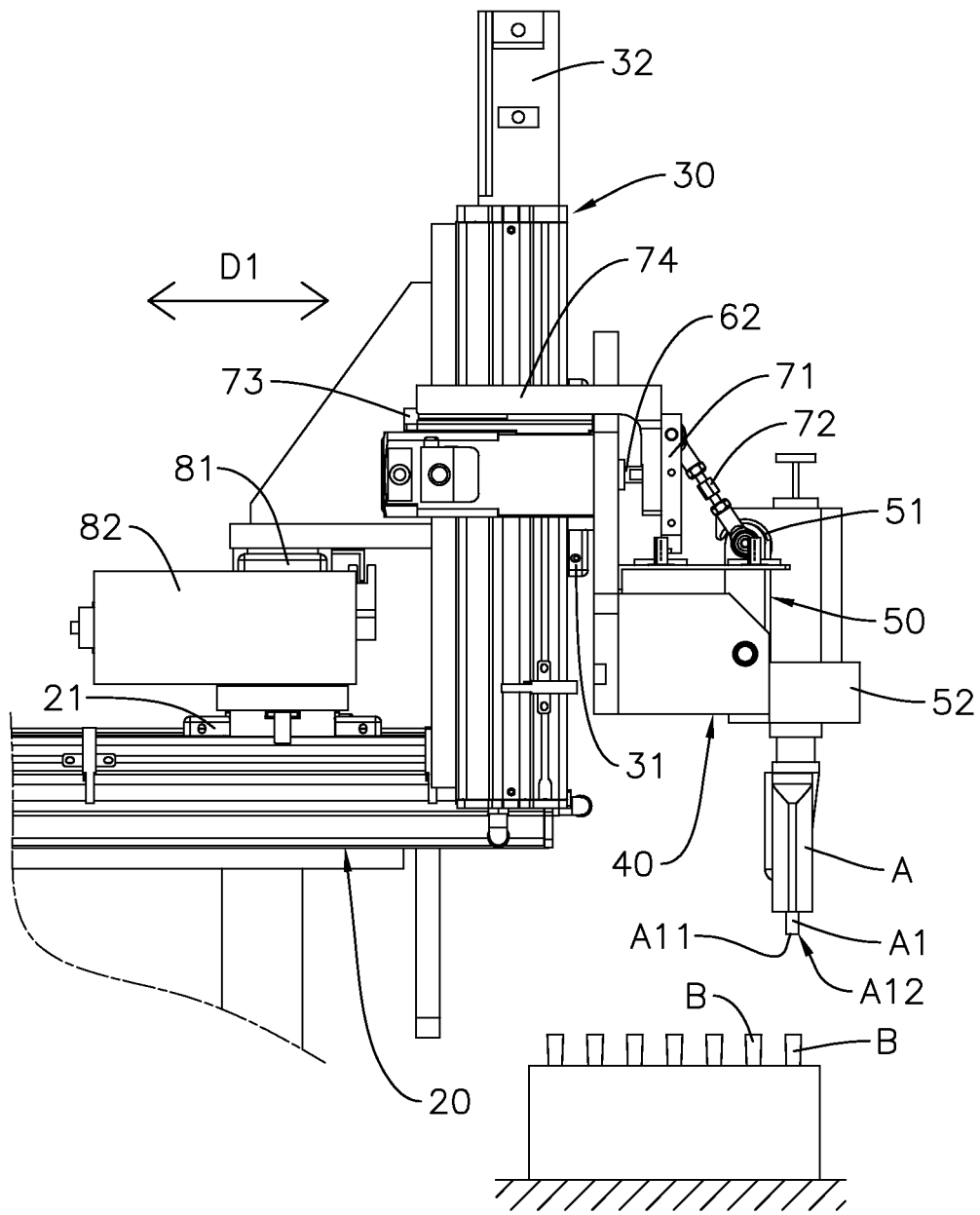
FIG. 5 is an enlarged schematic side view of the pipette-tip connecting device in FIG. 1.

With reference to FIG. 5, the second positioning mechanism 30 extends upward and downward along a second direction D2. The second direction D2 is preferably vertical, but can be slightly tilted relative to the vertical line. The second positioning mechanism 30 has a second slider 31 and a second actuator 32. The second slider 31 is slidable upward and downward along the second direction D2. The second actuator 32 controls the position of the second slider 31 along the second direction D2. The second actuator 32 is preferably a linear module.

Figure 3:
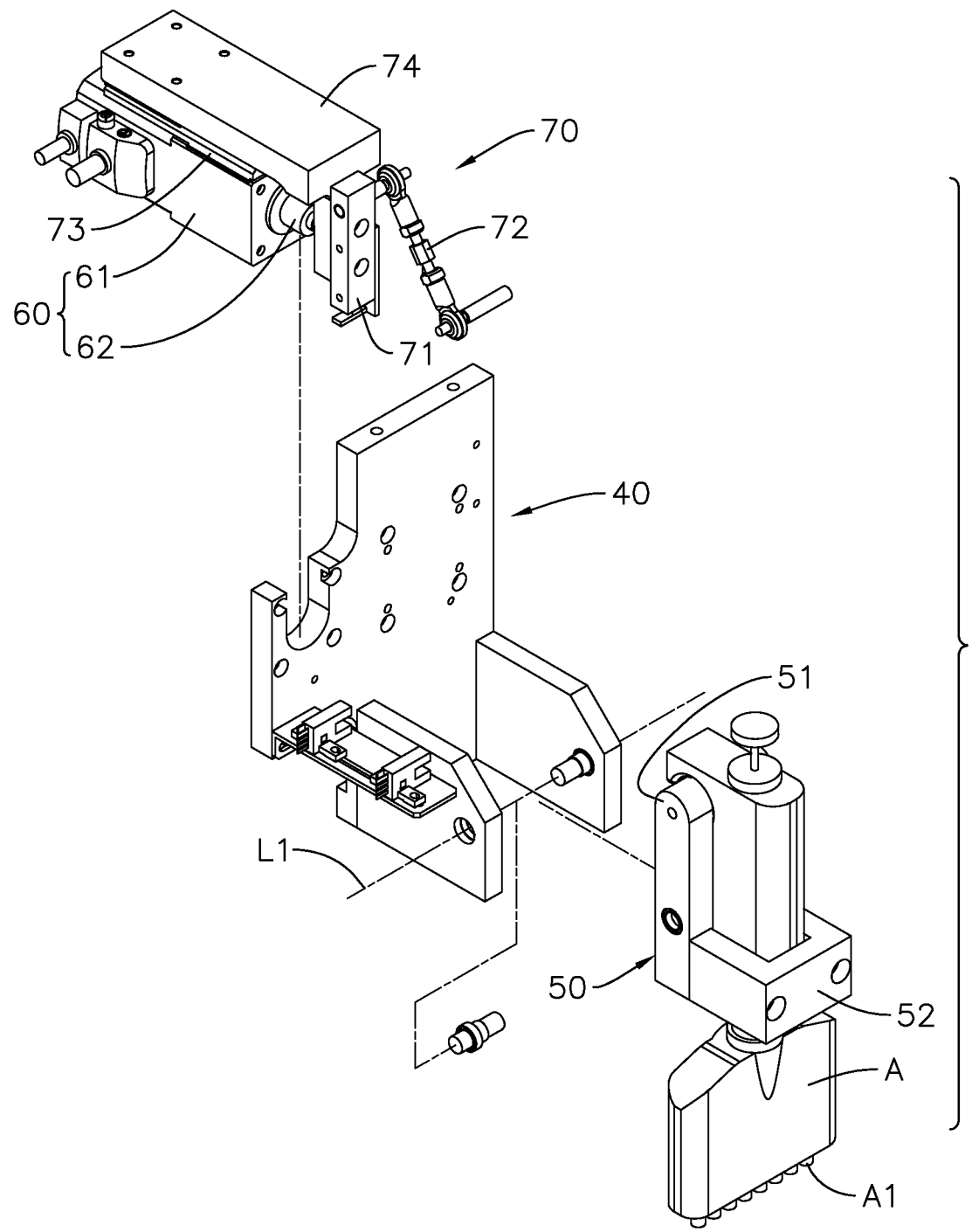
FIG. 3 is a partial exploded perspective view of the pipette-tip connecting device in FIG. 1.
Figure 6:
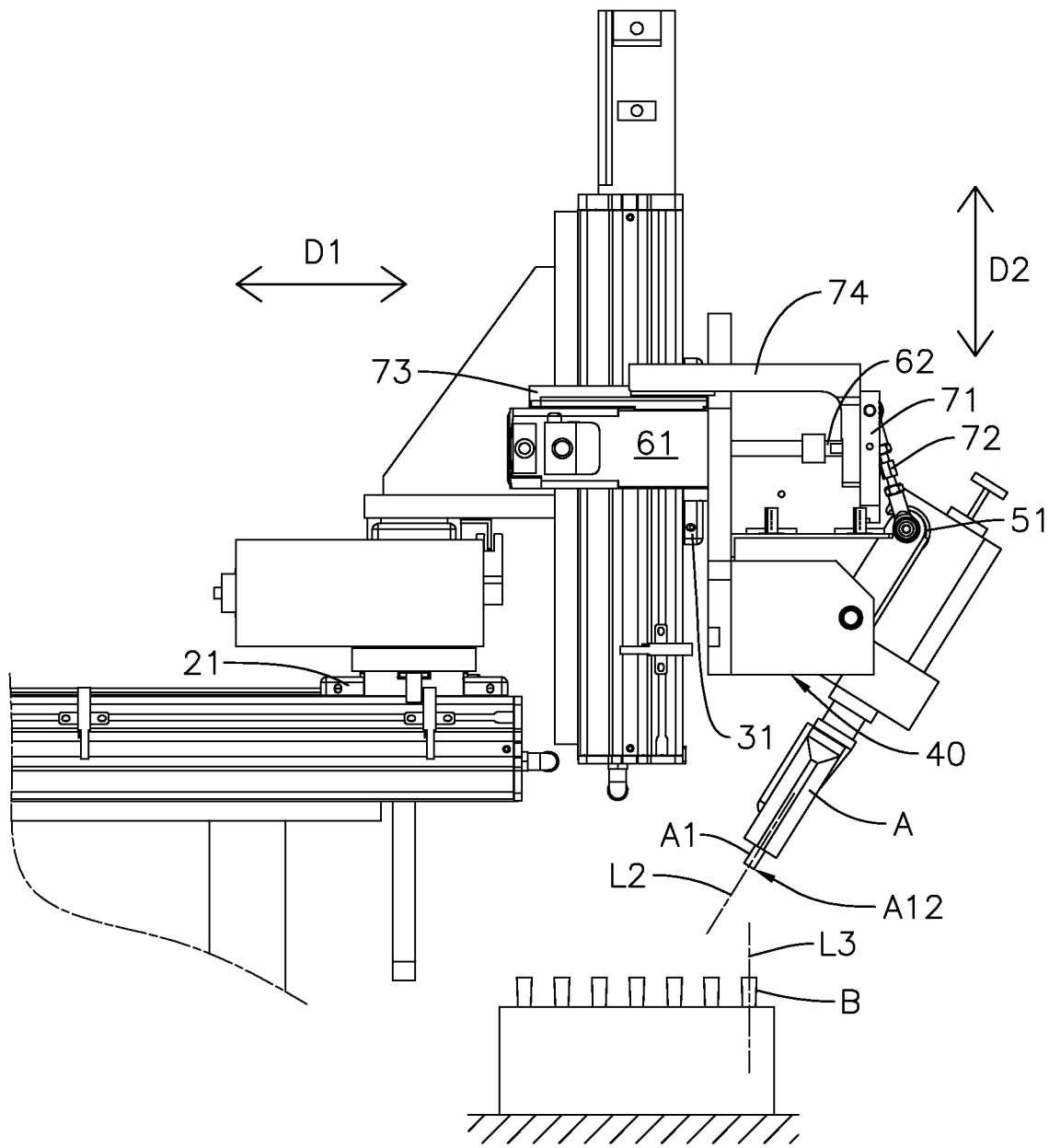
FIG. 6 is an enlarged operational side view of the pipette-tip connecting device in FIG. 1, showing a centerline of the pipette being tilted relative to a centerline of the pipette-tip.

With reference to FIGS. 3, 5, and 6, the connecting seat 40 is mounted on the second slider 31 such that the first positioning mechanism 20 and the second positioning mechanism 30 control a position of the connecting seat 40 along the first direction D1 and the second direction D2.

The pipette-fixing seat 50 is mounted on the connecting seat 40 and is pivotal relative to the connecting seat 40 around an imaginary pivoting axis L1. The pipette-fixing seat 50 has a pipette-driving end 51 and a pipette-fixing portion 52. The pipette-fixing portion 52 is configured to fix the pipette A. The pipette-fixing portion 52 moves in the first direction D1 and the second direction D2 when the pipette-fixing seat 50 pivots relative to the connecting seat 40. In other words, when the pipette-fixing seat 50 pivots, the pipette-fixing portion 52 moves along a circular path around the pivoting axis L1 such that movement of the pipette-fixing portion 52 has component in the first direction D1 and the second direction D2.

The pivoting axis L1 is nonparallel to the first direction D1 and the second direction D2, and to be precise, the pivoting axis L1 is perpendicular to the first direction D1 and second direction D2. The pipette-driving end 51 is located above the pivoting axis L1.

The tilt actuator 60 is mounted on the connecting seat 40 and controls a relative angle between the pipette-fixing seat 50 and the connecting seat 40. In the preferred embodiment, the tilt actuator 60 is a linear actuator and has a main body 61 and a driving rod 62. The main body 61 is mounted on the connecting seat 40. The driving rod 62 is linearly movably mounted in the main body 61. Linear movement of the driving rod 62 controls the relative angle between the pipette-fixing seat 50 and the connecting seat 40.

The tilt actuator 60 is electrically connected to the first actuator 22 and the second actuator 32 such that when the pipette-fixing seat 50 is being tilted by the tilt actuator 60, the position of the connecting seat 40 in the first direction D1 and the second direction D2 is dynamically compensated by the first actuator 22 and the second actuator 32 to substantially maintain the tip connector A1 of the pipette A in a fixed position.

The linkage mechanism 70 connects the tilt actuator 60 and the pipette-fixing seat 50 to transform linear motion of the driving rod 62 into rotary motion of the pipette-fixing seat 50. The linkage mechanism 70 has a connecting block 71, a connecting bar 72, a guiding seat 73 and a guiding slider 74.

The connecting block 71 is fixed to the driving rod 62 of the tilt actuator 60. Two opposite ends of the connecting bar 72 are a first end and a second end respectively. The first end is pivotally connected to the connecting block 71, and the second end is pivotally connected to the pipette-driving end 51 of the pipette-fixing seat 50. A relative angle between the connecting bar 72 and the driving rod 62 is preferably from 40 to 60 degrees to ensure that the linear motion of the driving rod 62 can be stably and precisely transformed into the rotary motion of the pipette-fixing seat 50.

The guiding seat 73 is fixed on the main body 61 of the tilt actuator 60. The guiding slider 74 is mounted on the guiding seat 73 and is capable of moving in parallel direction with the driving rod 62. The guiding slider 74 is disposed along with the driving rod 62 of the tilt actuator 60. The guiding slider 74 is fixed to the connecting block 71 such that when the connecting block 71 is moved by the force of the driving rod 62 and the guiding slider 74 to reduce the angle between the connecting block 71 and the connecting bar 72.

Figure 11:
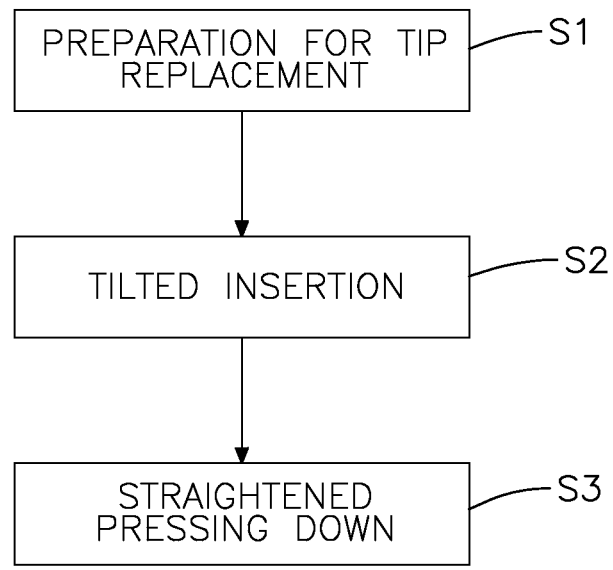
FIG. 11 is a flow chart of a pipette-tip connecting method in accordance with the present invention.

The tilt actuator 60 is not limited to be connected to the pipette-fixing seat 50 via the linkage mechanism 70. In another preferred embodiment, the tilt actuator 60 has an output end that controls rotary motion, and said output end is directly connected to the pipette-fixing seat 50 to change the angle between the pipette-fixing seat 50 and the connecting seat 40, and then is able to control the tilting angle of pipette A With reference to FIG. 11, a pipette-tip connecting method in accordance to the present invention comprises the following steps: the first step (S1) is preparation for tip replacement; the second step (S2) is tilted insertion; the third step (S3) is straightened pressing down. The pipette-tip connecting method is performed by, but not limited to, the aforementioned pipette-tip connecting device.

The first step (S1) is preparation for tip replacement. With reference to FIG. 5, fix the pipette A to the pipette-fixing seat 50. The cylindrical tip connectors A1 of the pipette A are protruded from a bottom of the pipette A as aforementioned. The first actuator 22 controls the position of the pipette-fixing seat 50 along the first direction D1. The second actuator 32 controls upward and downward movement of the pipette-fixing seat 50; that is, the second actuator 32 controls the movement of the pipette-fixing seat 50 along the second direction D2. The tilt actuator 60 controls the angle of the pipette-fixing seat 50. Prepare the pipette-tips B for replacement. The pipette-tips B extend upward and downward. Each one of the pipette-tips B has the mount opening formed on the top thereof.

Figure 7:
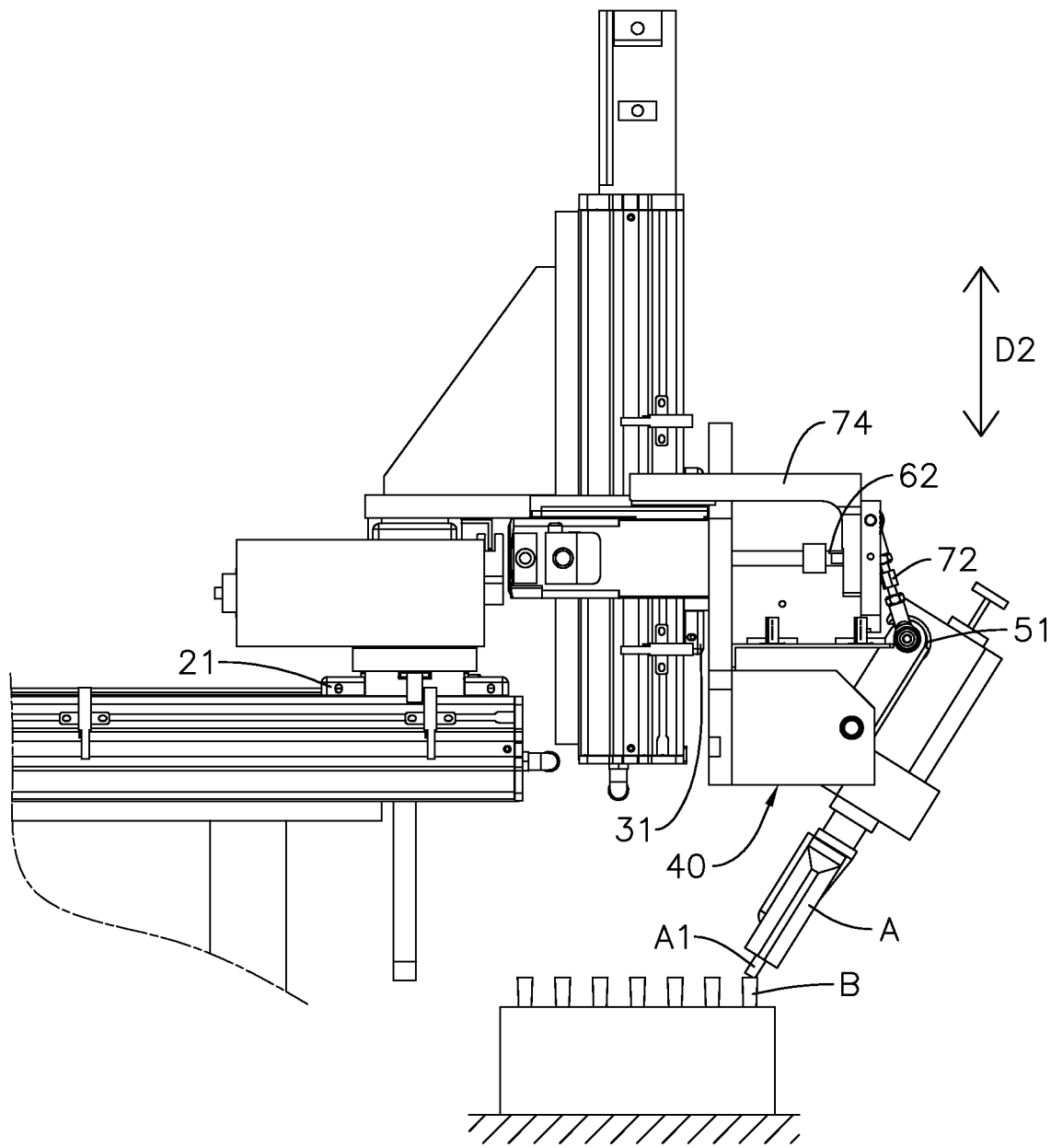
FIG. 7 is an enlarged operational side view of the pipette-tip connecting device in FIG. 1, showing the pipette moved downward and the tip connector inserted into the pipette-tip via a mount opening.

The second step (S2) is tilted insertion. With reference to FIG. 6 and FIG. 7, the tilt actuator 60 tilts the pipette A such that the centerlines L2 of the tip connectors A1 are tilted relative to the centerlines L3 of the pipette-tips B as shown in FIG. 6. The first actuator 22 aligns distal ends of the tip connectors A1 to the mount openings of the pipette-tips B. To be precise, the first actuator 22 aligns a corner A12 of each one of the tip connectors A1 above the mount opening of a corresponding one of the pipette-tips B, wherein said corner A12 is the portion of a distal end surface A11 and the pipette-tips B are connected primarily. When viewed laterally as shown in FIG. 5, the corner A12 forms two right angles.

Then, the second actuator 32 moves the pipette A downward such that the corners A12 of the tip connectors A1 are able to insert into the pipette-tips via the mount opening and then the second actuator moves continually the pipette downward such that the distal end of the at least one pipette-tip is partially inserted into the pipette-tips B via the mount openings.

Figure 8:
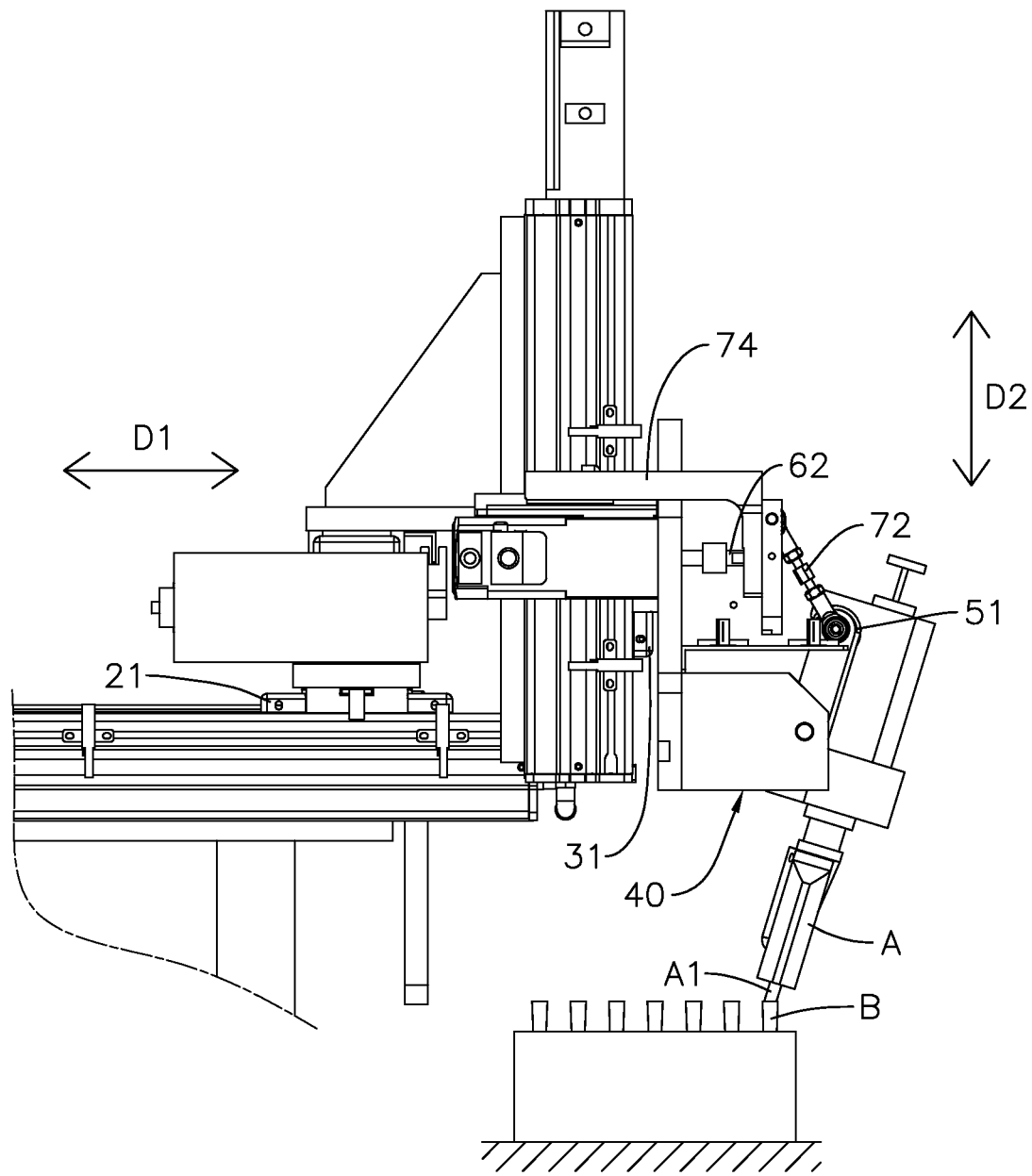
FIG. 8 is an enlarged operational side view of the pipette-tip connecting device in FIG. 1, showing the pipette rotated with the tip connectors as center of rotation to realign the tip connectors with the pipette-tips.
Figure 9:
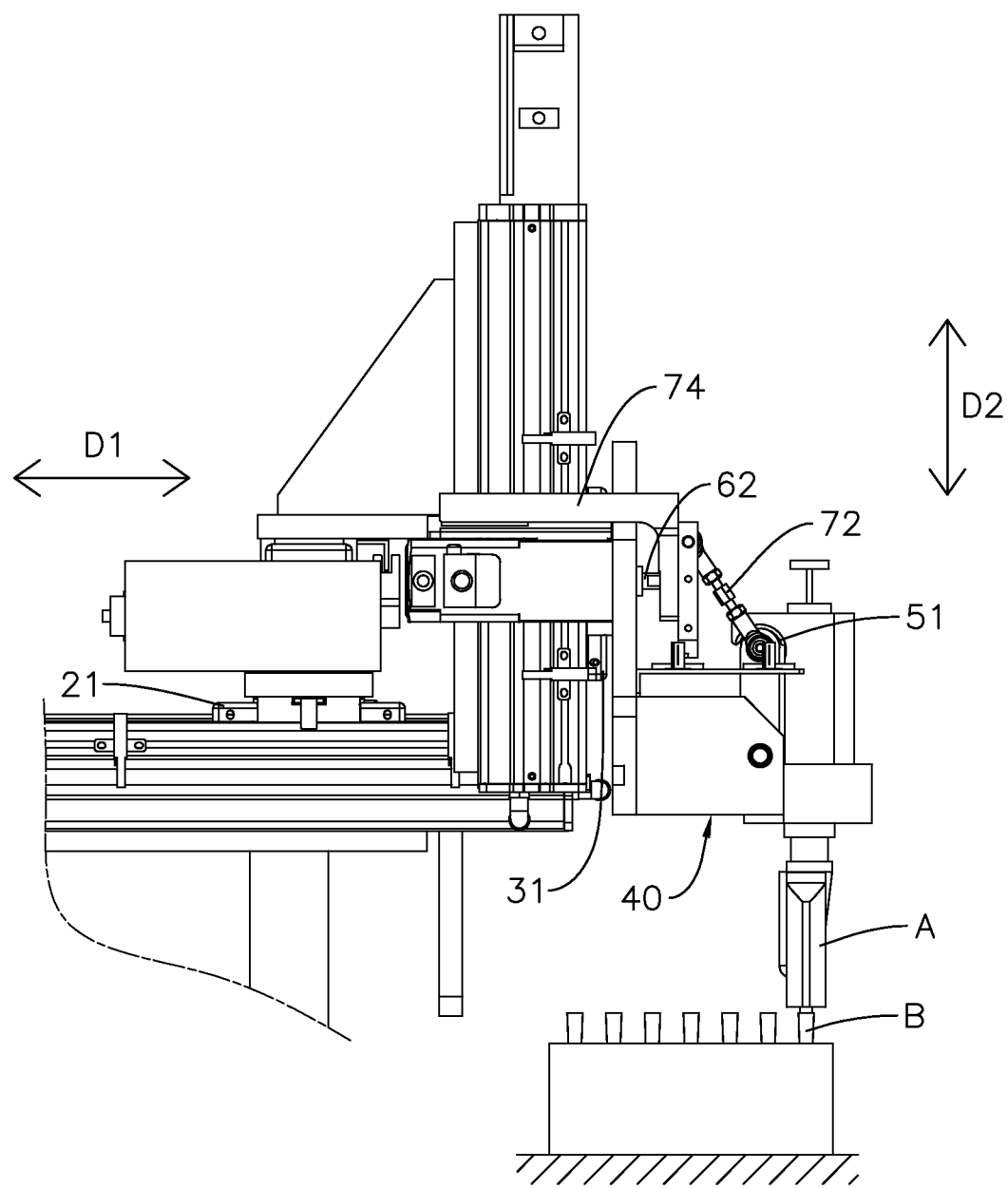
FIG. 9 is an enlarged operational side view of the pipette-tip connecting device in FIG. 1, showing the tip connectors aligned with the pipette-tips and fully inserted into the pipette-tips.

The third step (S3) is straightened pressing down. With reference to FIGS. 7 to 9, the tilt actuator 60, the first actuator 22, and the second actuator 32 control the pipette A such that the pipette A is rotated with the tip connectors A1 as center of rotation to align the centerlines L2 of each of the tip connectors A1 and match with the centerline L3 of the respective one of the pipette-tips B and to fully insert the distal end surfaces A11 of the tip connectors A1 into the pipette-tips B respectively. Finally, the second actuator 32 presses down the pipette A such that each of the tip connectors A1 is tightly fitted in the respective one of the pipette-tips B and abuts against an inner annular surface of a respective one of the pipette-tips B to connect the pipette-tips B to the tip connectors A1 correctly and securely.

Figure 10:
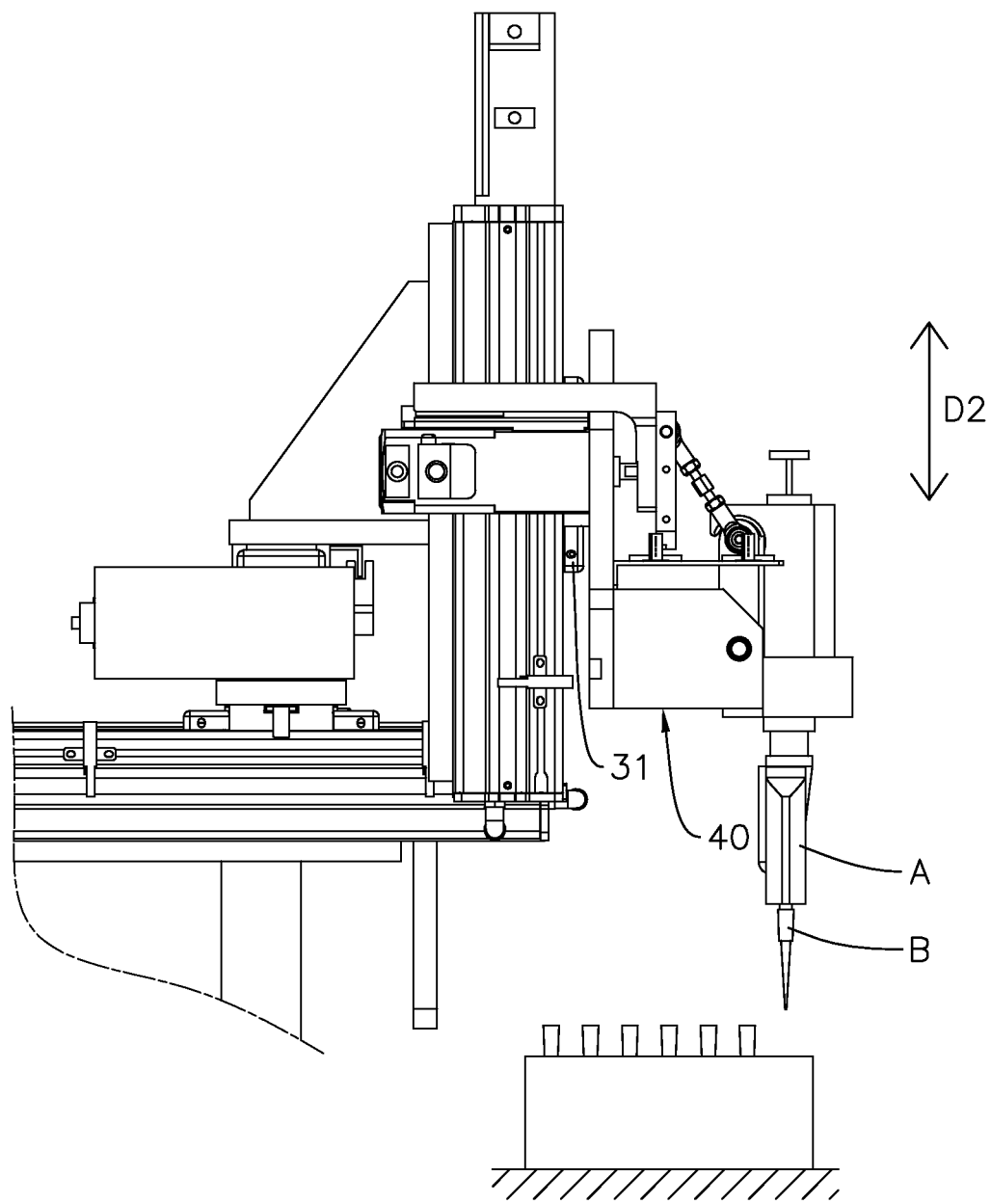
FIG. 10 is an enlarged operational side view of the pipette-tip connecting device in FIG. 1, showing the pipette moved upward with the pipette-tips connected to the tip connectors.

With reference to FIG. 9 and FIG. 10, after connecting the pipette-tips B to the tip connectors A1, the second actuator 32 moves the pipette A upward, and then the pipette A is moved elsewhere to draw and dispense liquid.

To sum up, the tilt actuator 60 enables the tip connectors A1 of the pipette A to be inserted into the mount openings of the pipette-tips B in an inclined manner. Therefore, the tip connectors A1 can be inserted into the mount openings as long as the corners A12 are above the mount openings. That is, when viewed laterally as shown in FIGS. 5 to 7, the tip connectors A1 can be successfully inserted into the mount openings as long as each one of the corners A12 is located between the widths of a respective one of the mount openings. There is no need to align the corners A12 with the centers of the mount openings with precision, thereby greatly reducing need of positioning accuracy and making automation process of repeating the connection the pipette A with new pipet-tips B possible. Production speed and labor need are therefore reduced significantly.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A pipette-tip connecting device comprising:
    a base;
    a first positioning mechanism mounted on the base and extending along a first direction; the first positioning mechanism having:
        a first slider being slidable along the first direction;
        a first actuator controlling a position of the first slider along the first direction;
    a second positioning mechanism linked to the first slider and extending upward and downward along a second direction; the second positioning mechanism having:
        a second slider being slidable upward and downward along the second direction;
        a second actuator controlling a position of the second slider along the second direction;
    a connecting seat mounted on the second slider;
    a pipette-fixing seat mounted on the connecting seat and being pivotable relative to the connecting seat around an imaginary pivoting axis; the pipette-fixing seat having:
        a pipette-fixing portion which moves in the first direction and the second direction when the pipette-fixing seat pivots relative to the connecting seat;
    a tilt actuator mounted on the connecting seat and controlling a relative angle between the pipette-fixing seat and the connecting seat; the tilt actuator electrically connected to the first actuator and the second actuator;
    wherein the tilt actuator has:
        a main body mounted on the connecting seat; and
        a driving rod linearly movably mounted in the main body and controlling the relative angle between the pipette-fixing seat and the connecting seat; and
    wherein the pipette-tip connecting device has a linkage mechanism connecting the tilt actuator and the pipette-fixing seat; the linkage mechanism has a connecting block fixed to the driving rod of the tilt actuator; and
    a connecting bar having
        a first end pivotally connected to the connecting block; and
        a second end being opposite to the first end and pivotally connected to the pipette-fixing seat.

2. The pipette-tip connecting device as claimed in claim 1, wherein
    the linkage mechanism has:
        a guiding seat fixed on the main body of the tilt actuator;
        a guiding slider mounted on the guiding seat and capable of moving in a parallel direction with the driving rod; the guiding slider disposed along with the driving rod of the tilt actuator; the guiding slider fixed to the connecting block.

3. The pipette-tip connecting device as claimed in claim 1, wherein
    the pipette-fixing seat has a pipette-driving end located above the pivoting axis;
    the second end of the connecting bar is pivotally connected to the pipette-driving end of the pipette-fixing seat;
    the relative angle between the connecting bar and the driving rod is from 40 degrees to 60 degrees.

4. The pipette-tip connecting device as claimed in claim 1 further comprising:
    a third positioning mechanism mounted on the first slider of the first positioning mechanism and extending along a third direction; the third positioning mechanism having:
        a third slider being movable along the third direction, wherein the second positioning mechanism is mounted on the third slider;
        a third actuator controlling a position of the third slider along the third direction.

5. The pipette-tip connecting device as claimed in claim 3 further comprising:
    a third positioning mechanism mounted on the first slider of the first positioning mechanism and extending along a third direction; the third positioning mechanism having:
        a third slider being movable along the third direction, wherein the second positioning mechanism is mounted on the third slider;
        a third actuator controlling a position of the third slider along the third direction.

* * * * *